Oct. 22, 1935.

J. F. JACKS 2,018,307

DIRIGIBLE HEADLIGHT

Filed Feb. 5, 1935

Inventor

Joseph F. Jacks

By Clarence A. O'Brien

Attorney

Oct. 22, 1935. J. F. JACKS 2,018,307
DIRIGIBLE HEADLIGHT
Filed Feb. 5, 1935 3 Sheets-Sheet 2
Fig. 2.
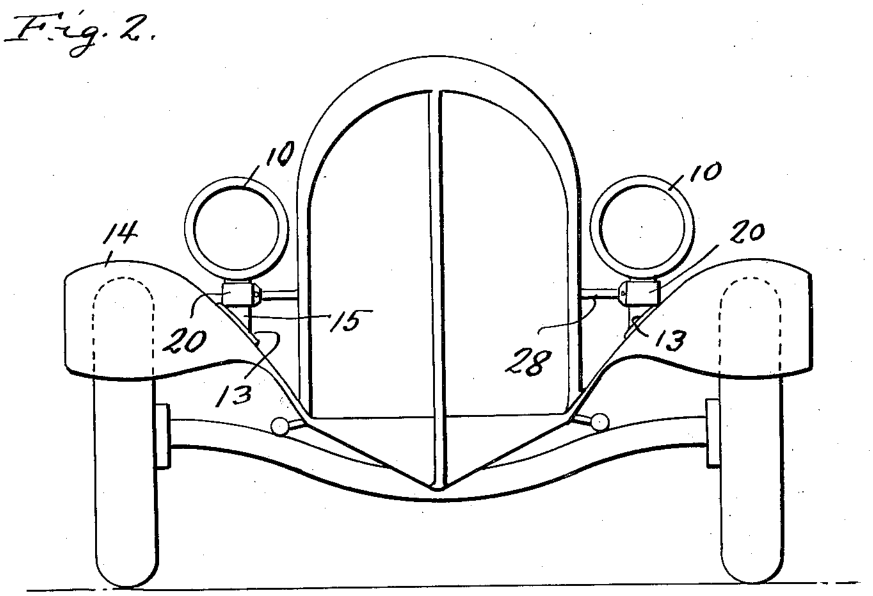
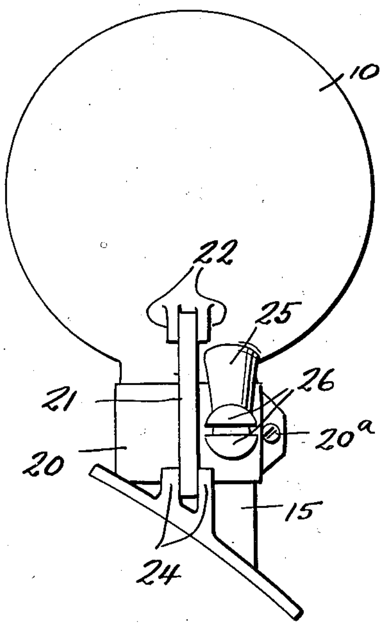
Fig. 4.
Fig. 5.
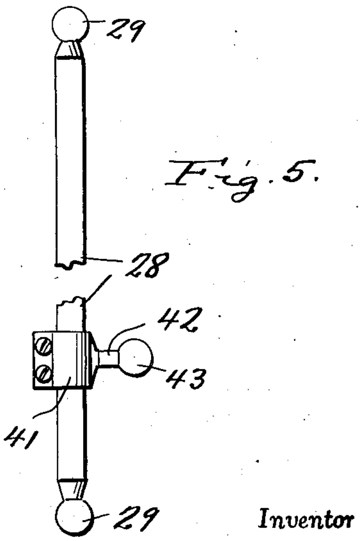
Inventor
Joseph F. Jacks
By Clarence A. O'Brien
Attorney Oct. 22, 1935. J. F. JACKS 2,018,307

DIRIGIBLE HEADLIGHT

Filed Feb. 5, 1935 3 Sheets-Sheet 3

Inventor

Joseph F. Jacks

By Clarence A. O'Brien, Attorney

Patented Oct. 22, 1935 2,018,307

UNITED STATES PATENT OFFICE 2,018,307

DIRIGIBLE HEADLIGHT

Joseph Fleming Jacks, Gasconade, Mo.

Application February 5, 1935, Serial No. 5,137

1 Claim. (Cl. 240—62.51)

This invention relates to dirigible headlights and the object of the invention is to provide a headlight structure of this character which embodies certain new and useful improvements over similar headlight structures, and which is characterized by economy of construction, operation and application to an automobile.

A further object of the invention is to provide a dirigible headlight structure which will steer easily and in proper relation to the steering wheels of the vehicles so as to cast the light in the direction of travel of the vehicle at all times.

The invention, together with its objects and advantages will be best understood from a study of the following description taken in connection with the accompanying drawings, wherein:

Fig. 2 is a front elevational view of the invention as applied.

Fig. 4 is an elevational view taken at right angles to Fig. 3.

Fig. 5 is a plan view of a connecting rod.

Figure 1:
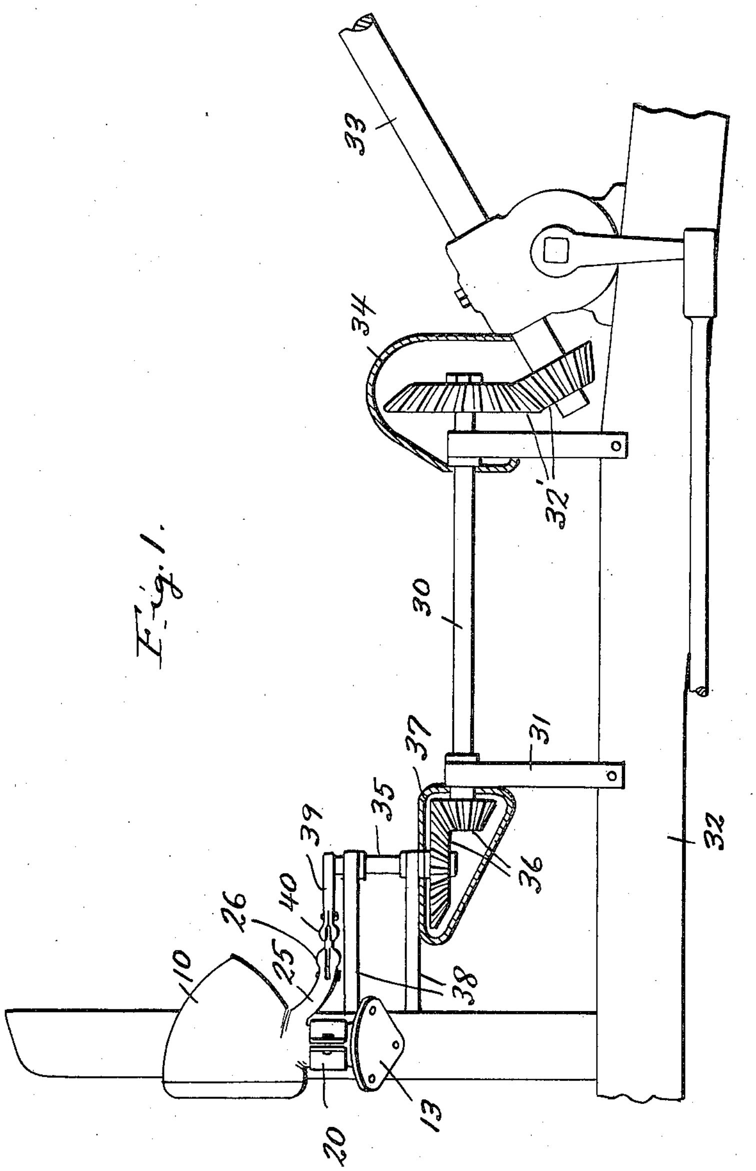
Fig. 1 is a detail view with parts shown in section and illustrating an application of the invention.
Figure 3:
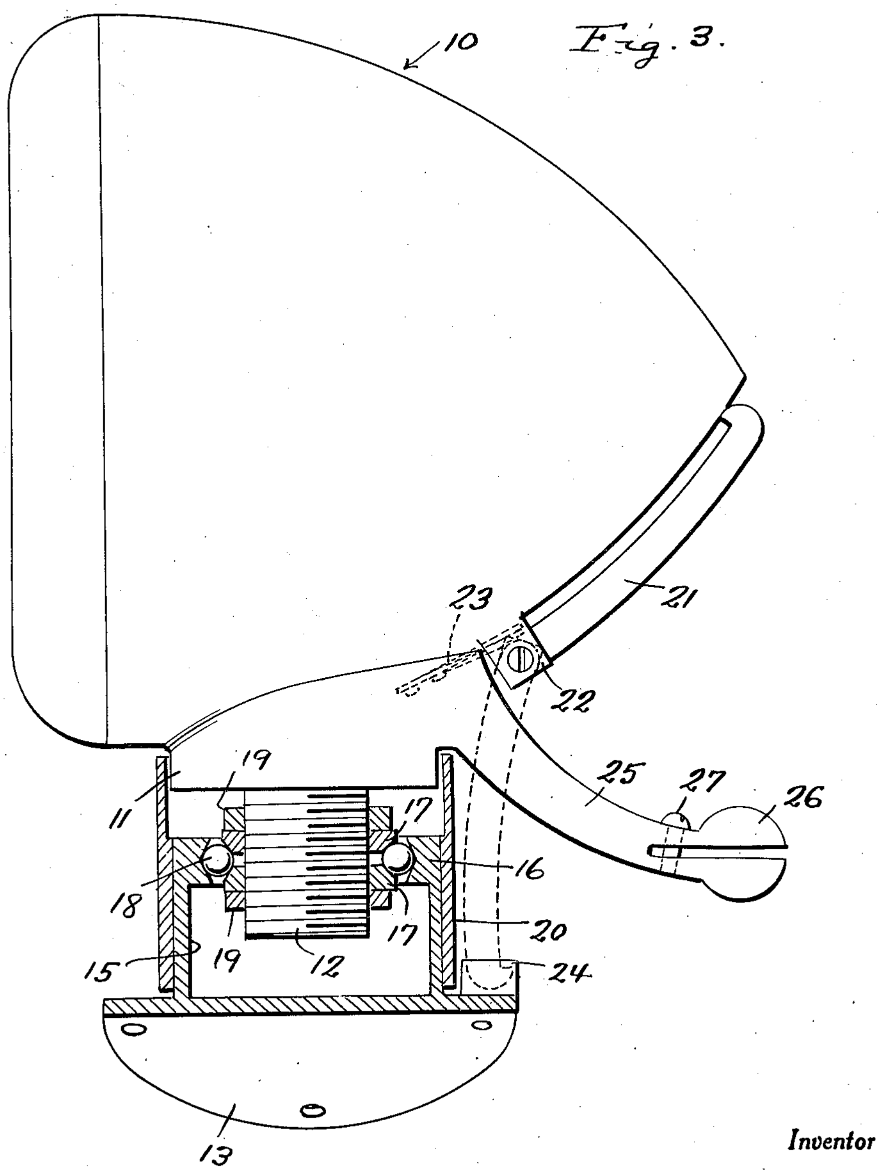
Fig. 3 is a side elevational view of a headlight, with certain parts shown in section illustrating the mounting for the headlight.

In accordance with the present invention, a pair of headlights 10 is provided for each vehicle and the casing of each headlight at its bottom is provided with a depending neck 11 through which extends a threaded stem 12. A bracket plate 13 is provided for attachment to a fender 14 of the automobile as suggested in Fig. 2, and rising from this plate 13 is a bearing socket 15 which, at its upper end, is provided with an integral internal ball race 16, the groove of which is substantially V-shape in cross section as shown in Fig. 3. A pair of complemental upper and lower race members 17 are provided to cooperate with the race 16, and anti-friction elements in the nature of balls 18 are provided between the races as shown. The shank 12 extends through the alined bearing races 17 and threadedly engaged with the shank are upper and lower nuts 19 which serve to secure the lamp at the desired vertical adjustment. Thus, it will be seen that an efficient means is provided for rotatably supporting the lamp to swing in a horizontal plane. Snugly fitting the socket 15 is a substantially cylindrical dust guard or casing 20 into the upper end of which extends the neck 11 of the lamp casing with sufficient clearance to permit free rotative movement of the lamp casing.

A retaining bar 21 is pivoted at one end to a pair of lugs 22 provided on the casing 10 and a suitable spring 23 is provided to engage the pivoted end of the bar 21 for holding the same in either its raised or lowered position. When the bar 21 is in the full line position shown in Fig. 3, it will be seen that the casing 10 may easily rotate. When the bar 21 is swung to the dotted line position shown in Fig. 3, the free end of the bar engages between a pair of lugs 24 provided on the plate 13, to thereby retain the headlight casing 10 against rotative movement. Thus, should any of the operating parts for rotating the headlights become broken, by reason of engagement of the bar 21 with the lugs 24, the headlights will be held in proper position against casual rotative movement.

Extending from the neck 11 thereof, the casing 10 is provided with an arm 25, the free end of which is formed into a ball socket 26 that is split as shown. A screw 27 is provided for contracting the socket 26.

For connecting the headlight casings 10, there is provided a tie-rod 28 that is provided on its ends with balls 29 that engage in the sockets 26 so that the headlights 10 are so connected that swinging movement of one will be transmitted to the other.

For turning the headlights incidental to a steering of the vehicle, there is provided a suitable mechanism in the form of a shaft 30 journaled in bearing standards 31 rising from a frame bar 32 of the automobile. At one end, the shaft 30 is connected by gearing 32′ with the steering post 33 of the automobile, and the gearing 32′ is substantially enclosed in a suitable housing 34. Drive from the steering post 33 to the shaft 30 is transmitted to a vertical shaft 35 through the medium of gearing 36 enclosed within a housing 37. The shaft 35 is journaled in bearing arms 38 that are suitably mounted in the automobile and the upper end of the shaft 35 is provided with a crank arm 39 that at its free end is provided with a spherical socket 40 in substantially the same manner as are the arms 25 associated with the headlight casings.

As best shown in Fig. 5, the split sleeve clamp 41 is secured at the desired adjustment on the rod 28 and extending from the sleeve 41 is a stem 42 provided with a ball head 43 that is engaged in the socket 40 of the arm 39. It will thus be seen that when the steering post 33 is rotated for steering the wheels of the vehicle, the headlights 10 will of course be rotated in a corresponding direction through the connections between the post 33 and the rod 28 just described.

It will also be noted that the protecting glasses 12 are retained in the forward end portions of the shells, which latter are desirably flared outwardly to provide protective flanges for accommodating the cushioning members 24 whereby the members 24 are secured in contracted position about the bearing sockets 15.

Having thus described the invention, what is claimed as new is:

1. In a dirigible headlight structure for automobiles, a pair of headlights, means for mounting the headlights on the front end of the motor vehicle for rotative movement in a horizontal plane, each of the headlights having a casing provided with a split substantially spherical socket, a rod connecting said headlights and provided at its ends with ball engaging sockets, means connecting the rod with the steering apparatus of an automobile for rotating the headlights incident to a steering of the automobile, a retaining arm pivotally mounted on the rear of the casing of the headlight, a socket disposed below the pivotal point of connection of the retaining arm, the free end of said arm being receivable therein, said socket being secured to the automobile, resilient means for normally holding said retaining arm in a position adjacent the headlight when not in use and within said socket for preventing rotation of the headlight when the rotating mechanism of the headlight becomes inoperative and a laterally extending projection on the free end of said arm adjacent to the inside of the casing of the headlight for holding a portion of said arm in spaced relation to the side of said casing, the casing defining a notch receiving slot whereby a tool may be inserted therein for moving said arm away from said casing.

JOSEPH F. JACOBS.